United States Patent
Sugita et al.

(10) Patent No.: US 12,104,427 B2
(45) Date of Patent: Oct. 1, 2024

(54) VEHICLE CONTROL DEVICE, VEHICLE CONTROL SYSTEM, VEHICLE CONTROL METHOD, AND STORAGE MEDIUM

(71) Applicant: TOYOTA JIDOSHA KABUSHIKI KAISHA, Toyota (JP)

(72) Inventors: Yoshiya Sugita, Toyota (JP); Shutaro Tokunaga, Kariya (JP); Ryusuke Ishikawa, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 354 days.

(21) Appl. No.: 17/660,484

(22) Filed: Apr. 25, 2022

(65) Prior Publication Data
US 2022/0340102 A1   Oct. 27, 2022

(30) Foreign Application Priority Data

Apr. 26, 2021   (JP) .................................. 2021-074501

(51) Int. Cl.
| | | |
|---|---|---|
| E05F 15/76 | (2015.01) | |
| B60R 25/24 | (2013.01) | |
| E05F 15/70 | (2015.01) | |
| E05F 15/73 | (2015.01) | |
| B60R 25/01 | (2013.01) | |

(52) U.S. Cl.
CPC ............ *E05F 15/76* (2015.01); *B60R 25/245* (2013.01); *E05F 15/70* (2015.01); *E05F 15/73* (2015.01); *B60R 25/01* (2013.01); *E05Y 2400/45* (2013.01); *E05Y 2400/856* (2013.01); *E05Y 2900/50* (2013.01); *E05Y 2900/531* (2013.01); *E05Y 2900/532* (2013.01); *E05Y 2900/546* (2013.01)

(58) Field of Classification Search
None
See application file for complete search history.

(56) References Cited

U.S. PATENT DOCUMENTS

| | | | |
|---|---|---|---|
| 2016/0042580 A1 | 2/2016 | Funayama | |
| 2018/0038146 A1* | 2/2018 | Linden | ..................... E05B 81/64 |
| 2019/0048646 A1* | 2/2019 | Tachibana | ............... E05F 15/77 |

FOREIGN PATENT DOCUMENTS

| | | |
|---|---|---|
| CN | 105370140 A | 3/2016 |
| JP | 2012-193580 A | 10/2012 |
| JP | 2017122367 A * | 7/2017 |

* cited by examiner

Primary Examiner — Peter D Nolan
Assistant Examiner — Michael F Whalen
(74) Attorney, Agent, or Firm — Oblon, McClelland, Maier & Neustadt, L.L.P.

(57) ABSTRACT

A vehicle control device includes: an acquisition section configured to acquire a determination result as to whether a predetermined communication terminal is in a vehicle cabin interior area, and acquire another determination result as to whether or not the communication terminal is in a vehicle cabin exterior area; and a control section configured to, based on the determination results of the acquisition section, initiate a closing operation of a vehicle door in cases in which a determination is made that the communication terminal is in the vehicle cabin exterior area, and stop the closing operation in cases in which a determination is made that the communication terminal is in the vehicle cabin interior area after the closing operation was initiated.

7 Claims, 5 Drawing Sheets

VEHICLE CONTROL DEVICE, VEHICLE CONTROL SYSTEM, VEHICLE CONTROL METHOD, AND STORAGE MEDIUM

CROSS-REFERENCE TO RELATED APPLICATION

This application is based on and claims priority under 35 USC 119 from Japanese Patent Application No. 2021-074501 filed on Apr. 26, 2021, the disclosure of which is incorporated by reference herein.

BACKGROUND

Technical Field

The present disclosure relates to a vehicle control device, a vehicle control system, a vehicle control method, and a non-transitory storage medium stored with a vehicle control program for controlling opening and closing of a vehicle door.

Related Art

Japanese Patent Application Laid-Open (JP-A) No. 2017-122367 proposes a vehicle door opening/closing device including a kick sensor and a door control ECU. The kick sensor detects a detection target at the periphery of a vehicle door. The door control ECU controls so as to perform drive closing of the vehicle door in cases in which the detection target is detected by the kick sensor, a determination is made that a vehicle cabin exterior authentication of an electronic key is normal, and a determination is also made that vehicle cabin interior authentication of the electronic key has failed.

The door closing operation is performed after waiting for determination results regarding both the determination as to whether or not a communication terminal such as the electronic key is in a vehicle cabin interior area, and the determination as to whether or not the communication terminal is in a vehicle cabin exterior area, Thus, there is a time lag between a user moving away from the vehicle and the door closing operation being initiated, which might cause the user to feel uncertain.

SUMMARY

In consideration of the above circumstances, the present disclosure provides a vehicle control device, a vehicle control system, a vehicle control method, and a non-transitory storage medium stored with a vehicle control program that are capable of reducing a time lag before a door closing operation is initiated, and thereby reduce any uncertainty felt by a user as a result.

A first aspect of the present disclosure is a vehicle control device including: an acquisition section configured to acquire a determination result as to whether a predetermined communication terminal is in a vehicle cabin interior area, and acquire another determination result as to whether or not the communication terminal is in a vehicle cabin exterior area; and a control section configured to, based on the determination results of the acquisition section, initiate a closing operation of a vehicle door in cases in which a determination is made that the communication terminal is in the vehicle cabin exterior area, and stop the closing operation in cases in which a determination is made that the communication terminal is in the vehicle cabin interior area after the closing operation was initiated.

In the first aspect, the acquisition section acquires the determination result as to whether or not the predetermined communication terminal is in the vehicle cabin interior area, and also acquires the determination result as to whether or not the communication terminal is in the vehicle cabin exterior area.

The control section then perform controls, based on the determination results acquired by the acquisition section, to initiate the closing operation of the vehicle door in cases in which a determination is made that the communication terminal is in the vehicle cabin exterior area, and to stop the closing operation in cases in which a determination is made that the communication terminal is in the vehicle cabin interior area after the closing operation was initiated. Thus, the closing operation of the vehicle door is initiated in cases in which a determination is made that the communication terminal is in the vehicle cabin exterior area, thereby enabling any uncertainly felt by the user due to the time lag before the closing operation of the vehicle door is initiated to be reduced.

Moreover, in cases in which a determination is made that the communication terminal is in the vehicle cabin interior area after the closing operation of the vehicle door has been initiated, the closing operation of the vehicle door is stopped, thereby preventing the communication terminal from being locked inside the vehicle.

Note that the control section may be configured to perform control to continue the closing operation in cases in which a determination is made that the communication terminal is not in the vehicle cabin interior area after the closing operation was initiated.

Moreover, the control section may be configured to perform the control to initiate the closing operation prior to the determination regarding the vehicle cabin interior area.

Moreover, the control section may be configured to perform the control to initiate the closing operation in cases in which a closing instruction for the vehicle door has been received.

Moreover, the control section may be configured to perform the control to initiate the closing operation in cases in which a determination is made that the communication terminal is in the vehicle cabin exterior area and, subsequently, another determination is made that the communication terminal is no longer in the vehicle cabin exterior area.

Note that a vehicle control system may be configured including the vehicle control device, the communication terminal, and a drive section configured to perform drive opening and closing of the vehicle door under control of the control section.

A second aspect of the present disclosure is a vehicle control method including: acquiring a determination result as to whether or not a predetermined communication terminal is in a vehicle cabin interior area, and acquiring another determination result as to whether or not the communication terminal is in a vehicle cabin exterior area; and based on the acquired determination results, initiating a closing operation of a vehicle door in cases in which a determination is made that the communication terminal is in the vehicle cabin exterior area, and stopping the closing operation in cases in which a determination is made that the communication terminal is in the vehicle cabin interior area after the closing operation was initiated.

A third aspect of the present disclosure may be a non-transitory storage medium storing a program executable by a computer to perform vehicle control processing, the vehicle control processing including: acquiring a determination result as to whether or not a predetermined communication terminal is in a vehicle cabin interior area, and acquiring another determination result as to whether or not the communication terminal is in a vehicle cabin exterior area; and based on the acquired determination results, initiating a closing operation of a vehicle door in a case in which a determination is made that the communication terminal is in the vehicle cabin exterior area, and stopping the closing operation in a case in which a determination is made that the communication terminal is in the vehicle cabin interior area after the closing operation was initiated.

As described above, the present disclosure enables the provision of a vehicle control device, a vehicle control system, a vehicle control method, and a non-transitory storage medium stored with a vehicle control program that are capable of reducing the time lag before the door closing operation is initiated, and thereby reduce any uncertainty felt by the user as a result.

DETAILED DESCRIPTION

Figure 1:
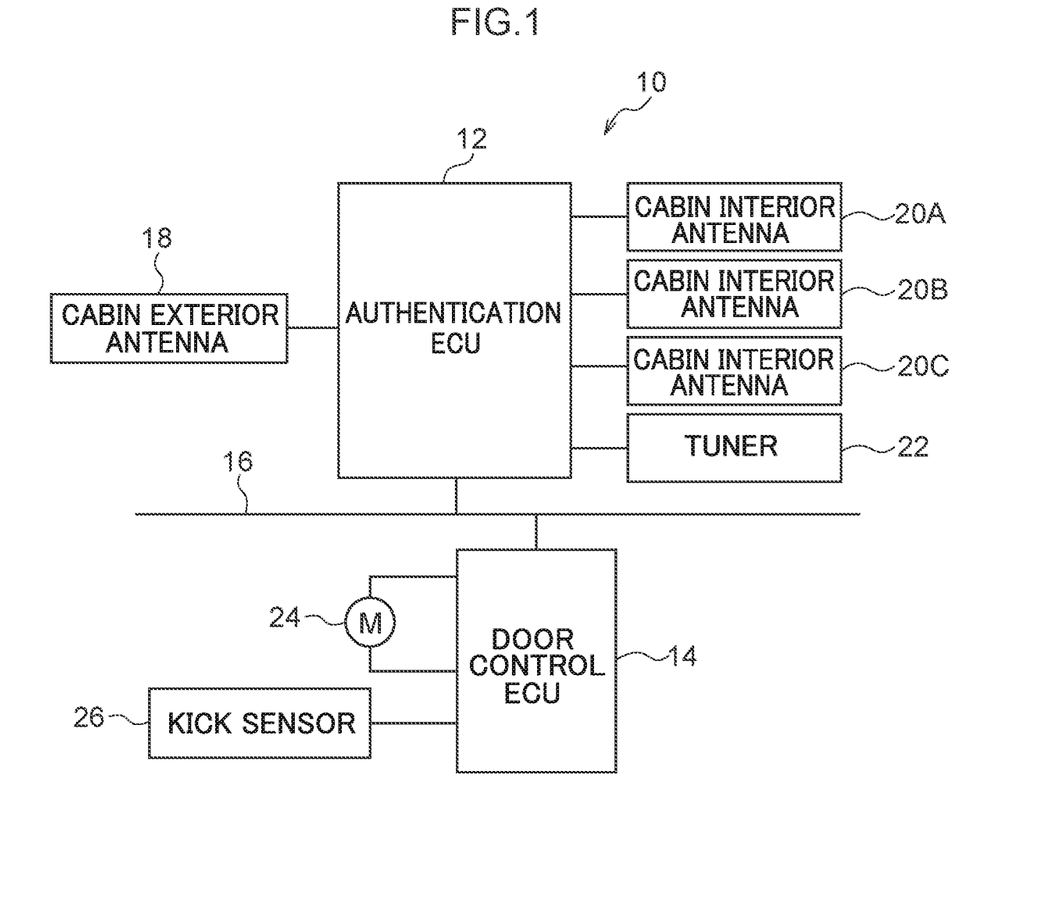
FIG. 1 is a block diagram illustrating an example of a schematic configuration of a vehicle door opening/closing device according to an exemplary embodiment.
Figure 2:
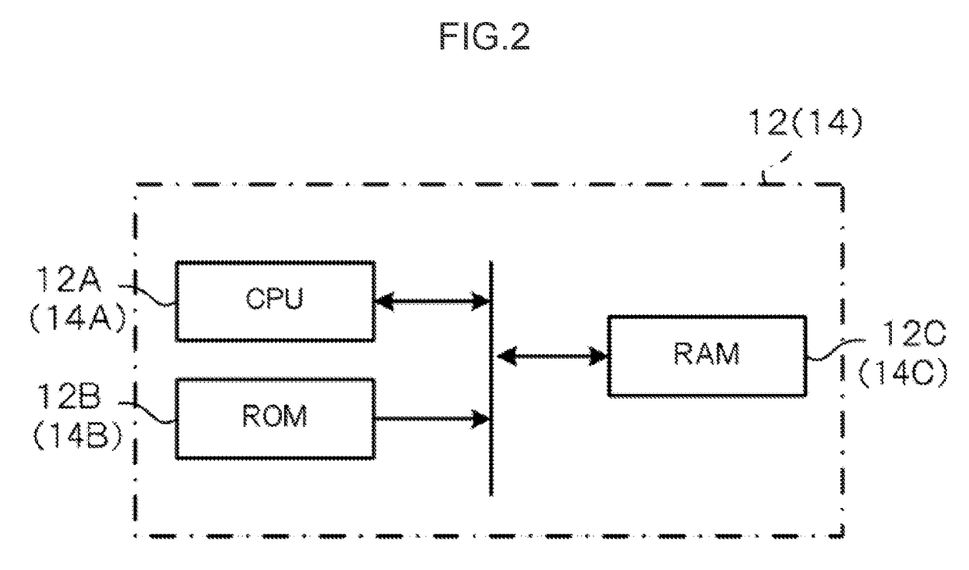
FIG. 2 is a block diagram illustrating a schematic configuration of an authentication ECU and a door control ECU of a vehicle door opening/closing device according to an exemplary embodiment.
Figure 3:
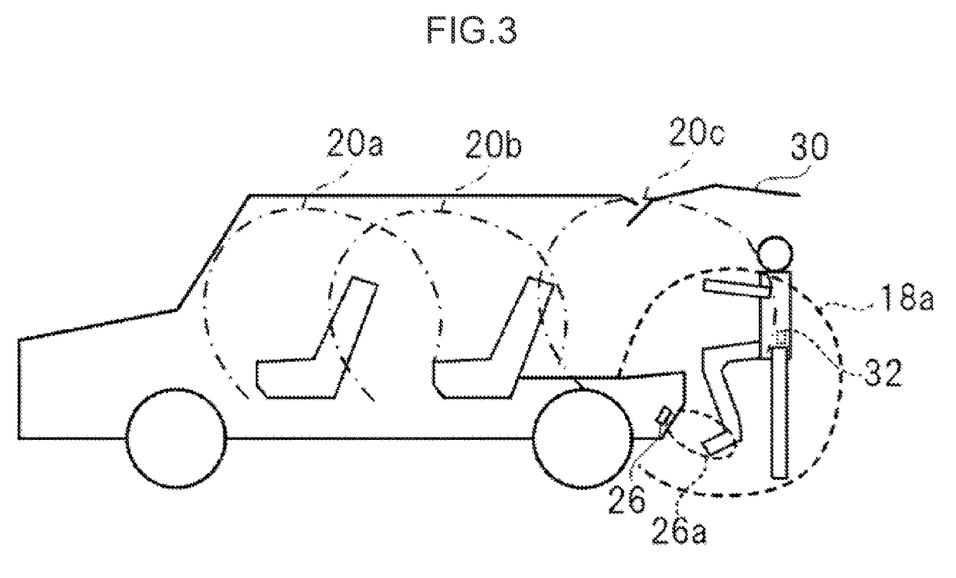
FIG. 3 is a side view cross-section illustrating an example of a schematic configuration of a vehicle according to an exemplary embodiment.

Detailed explanation follows regarding an exemplary embodiment of the present disclosure, with reference to the drawings. In the exemplary embodiment, a vehicle door opening/closing device for controlling opening and closing of a vehicle door is described as an example of a vehicle control system. FIG. 1 is a block diagram illustrating an example of a schematic configuration of the vehicle door opening/closing device according to the exemplary embodiment. FIG. 2 is a block diagram illustrating a schematic configuration of an authentication ECU and a door control ECU of the vehicle door opening/closing device according to the exemplary embodiment. FIG. 3 is a side view cross-section illustrating an example of a schematic configuration of a vehicle according to the exemplary embodiment.

First, explanation follows regarding a configuration of a vehicle door opening/closing device 10 according to the exemplary embodiment, with reference to FIG. 1 to FIG. 3. As illustrated in FIG. 1, the vehicle door opening/closing device 10 includes an authentication electronic control unit (ECU) 12 and a door control ECU 14.

As illustrated in FIG. 2, the authentication ECU 12 is configured by a microcomputer including a central processing unit (CPU) 12A, read only memory (ROM) 12B, random access memory (RAM) 12C, and so on. A cabin exterior antenna 18, cabin interior antennae 20A to 20C, and a tuner 22 are connected to the authentication ECU 12.

As illustrated in FIG. 2, the door control ECU 14 is similarly configured by a microcomputer including a CPU 14A, ROM 14B, RAM 14C, and so on. An actuator 24, serving as a drive section, and a kick sensor 26 are connected to the door control ECU 14. The authentication ECU 12 and the door control ECU 14 are both connected to an onboard network 16 such as a controller area network (CAN).

As illustrated in FIG. 3, the cabin exterior antenna 18 receives a signal emitted by an electronic key 32, serving as a communication terminal, when present within a predetermined reception range 18a of a vehicle cabin exterior area. The cabin interior antennae 20A to 20C receive the signal emitted by the electronic key 32 when present within respective predetermined reception ranges 20a to 20c of a vehicle cabin interior area. Note that although the reception range 18a and the reception range 20c partially overlap each other in the exemplary embodiment as illustrated in FIG. 3, these ranges may be configured so as not to overlap one another. Moreover the number of antennae configuring the cabin exterior antenna 18 and the cabin interior antennae 20A to 20C are not limited to the number in the example illustrated in FIG. 1, and may be set as appropriate in response to reception ranges of the respective antennae, the desired reception accuracy, and so on.

The authentication ECU 12 authenticates the electronic key 32 located outside the vehicle cabin (hereafter referred to as a "vehicle cabin exterior authentication") based on the signal from the electronic key 32 received by the cabin exterior antenna 18. The authentication ECU 12 similarly authenticates the electronic key 32 located inside the vehicle cabin (hereafter referred to as a "vehicle cabin interior authentication") based on the signal from the electronic key 32 received by one out of the cabin interior antennae 20A to 20C.

Specifically, in cases in which the electronic key 32 is not present within the reception range 18a, the authentication ECU 12 determines that the vehicle cabin exterior authentication has failed. In cases in which the electronic key 32 is present within the reception range 18a but a key ID of the electronic key 32 does not match a predetermined key ID serving as a key ID corresponding to the ego (local) vehicle, the authentication ECU 12 determines that the vehicle cabin exterior authentication has failed. Furthermore, in cases in which the electronic key 32 is present within the reception range 18a and the key ID of the electronic key 32 matches the predetermined key ID serving as the key ID corresponding to the ego vehicle, the authentication ECU 12 determines that the vehicle cabin exterior authentication is normal (i.e., succeeded).

In cases in which the electronic key 32 is not present within any of the reception ranges 20a to 20c, the authentication ECU 12 determines that the vehicle cabin interior authentication has failed. In cases in which the electronic key 32 is present within any of the reception ranges 20a to 20c but the key ID of the electronic key 32 does not match the predetermined key ID serving as the key ID corresponding to the ego vehicle, the authentication ECU 12 determines that the vehicle cabin interior authentication has failed. Furthermore, in cases in which the electronic key 32 is present within any of the reception ranges 20a to 20c and the key ID of the electronic key 32 matches the predetermined key ID serving as the key ID corresponding to the ego vehicle, the authentication ECU 12 determines that the vehicle cabin interior authentication is normal (i.e., succeeded).

The tuner 22 adjusts the reception range 18a of the cabin exterior antenna 18 and the respective reception ranges 20a to 20c of the cabin interior antennae 20A to 20C under the control of the authentication ECU 12.

The actuator 24 opens and closes a vehicle door 30 (see FIG. 3) at a vehicle rear section under the control of the door control ECU 14.

As illustrated in FIG. 3, the kick sensor 26 may for example be provided inside a rear bumper so as to detect for a detection target at the periphery of the vehicle door 30. Specifically, the kick sensor 26 is an electrostatic sensor including a sensor electrode. The kick sensor 26 detects for the detection target (a leg of a user in the exemplary embodiment) within a predetermined detection range 26a by detecting changes in electrostatic capacitance between the sensor electrode and the detection target.

Note that the kick sensor 26 is not limited to being an electrostatic sensor, and another member capable of detecting the detection target, such as an infrared sensor or a physical switch, may be employed therefor. Moreover, the installation position of the kick sensor 26 is not limited to being inside the rear bumper, and may be another position where the detection target can be detected, such as under the vehicle or in a rear garnish. Alternatively, the kick sensor 26 may be omitted.

Moreover, a switch to instruct opening and closing of the vehicle door 30 is provided to the electronic key 32, and an instruction to open or close the vehicle door 30 may be issued by operating this switch.

The door control ECU 14 controls the actuator 24 so as to perform drive closing of the vehicle door 30 based on a determination result of the vehicle cabin interior authentication and a determination result of the vehicle cabin exterior authentication by the authentication ECU 12, and on a switch operation of the electronic key 32 or a detection result by the kick sensor 26.

Note that in the exemplary embodiment, the door control ECU 14 corresponds to a vehicle control device, and functions as an example of an acquisition section and a control section.

Figure 4:
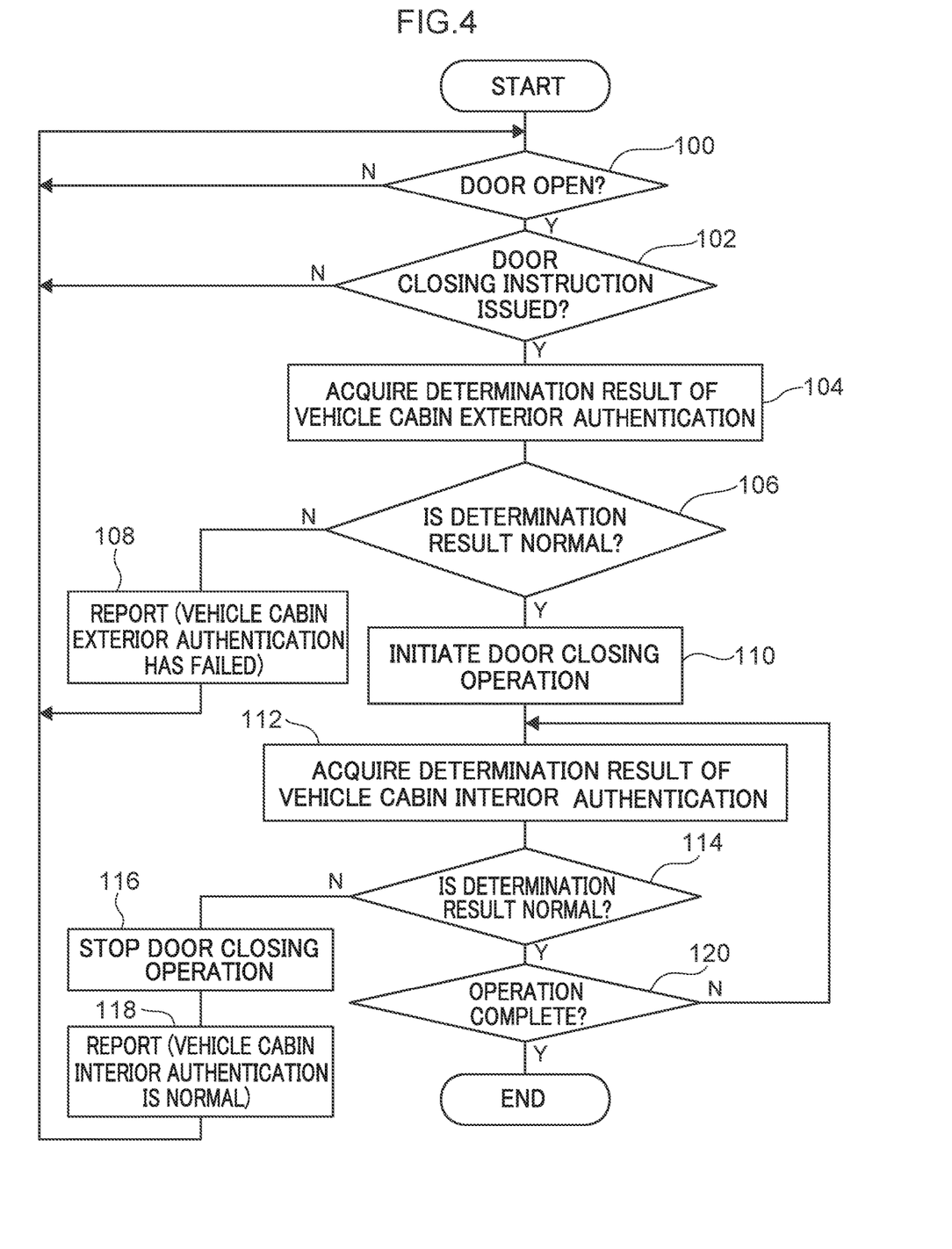
FIG. 4 is a flowchart illustrating an example of a flow of processing executed by a door control ECU of a vehicle door opening/closing device according to an exemplary embodiment.

Next, explanation follows regarding specific processing performed by the door control ECU 14 of the vehicle door opening/closing device 10 according to the exemplary embodiment, with reference to FIG. 4. FIG. 4 is a flowchart illustrating an example of a flow of processing executed by the door control ECU 14 of the vehicle door opening/closing device 10 according to the exemplary embodiment. In the exemplary embodiment, the processing illustrated in FIG. 4 is performed by the door control ECU 14 executing a program stored in advance in the ROM. Execution of the processing illustrated in FIG. 4 is for example initiated in cases in which the vehicle door 30 has shifted from a closed state to an open state.

At step 100, the CPU 14A determines whether or not the vehicle door 30 has been placed in the open state based on a state of a non-illustrated courtesy switch. Processing returns to step 100 in cases in which this determination is negative, whereas processing transitions to step 102 in cases in which this determination is affirmative.

At step 102, the CPU 14A determines whether or not a door closing instruction has been issued. This determination involves for example determining whether or not the door closing instruction has been issued by operation of the switch on the electronic key 32, or determining whether or not the detection target has been detected by the kick sensor 26. Alternatively, in cases in which a switch or the like for issuing a vehicle door closing instruction is provided separately to the kick sensor 26, determination may be made as to whether or not the door closing instruction has been issued using this switch. Processing returns to step 100 in cases in which this determination is negative, whereas processing transitions to step 104 in cases in which this determination is affirmative.

At step 104, the CPU 14A causes the authentication ECU 12 to execute a vehicle cabin exterior authentication, acquires a determination result of the vehicle cabin exterior authentication by the authentication ECU 12, and transitions to step 106.

At step 106, the CPU 14A determines whether or not the determination result of the vehicle cabin exterior authentication acquired at step 104 is normal. Processing transitions to step 108 in cases in which this determination is negative, whereas processing transitions to step 110 in cases in which this determination is affirmative.

At step 108, the CPU 14A reports that the determination result of the vehicle cabin exterior authentication has failed before returning to step 100 and repeating the processing described above. Specifically, the CPU 14A may for example generate an alert sound indicating that the determination result of the vehicle cabin exterior authentication has failed. Note that the CPU 14A may report that the determination result of the vehicle cabin exterior authentication has failed using a flashing lamp rather than an alert sound. Alternatively, the CPU 14A may report that the vehicle cabin exterior authentication has failed using both an alert sound and a flashing lamp.

On the other hand, at step 110, the CPU 14A controls the actuator 24 so as to initiate a closing operation of the vehicle door 30, and transitions to step 112.

At step 112, the CPU 14A causes the authentication ECU 12 to execute a vehicle cabin interior authentication, acquires a determination result of the vehicle cabin interior authentication by the authentication ECU 12, and transitions to step 114.

At step 114, the CPU 14A determines whether or not the determination result of the vehicle cabin interior authentication acquired at step 112 is normal. Namely, determination is made as to whether or not the electronic key 32 has been locked inside the vehicle. Processing transitions to step 116 in cases in which this determination is affirmative, whereas processing transitions to step 120 in cases in which this determination is negative.

At step 116, the CPU 14A controls the actuator 24 so as to stop the closing operation of the vehicle door 30, and transitions to step 118. Note that the vehicle door 30 may be returned to its open position after the closing operation of the vehicle door 30 has been stopped.

At step 118, the CPU 14A reports that the determination result of the vehicle cabin interior authentication is normal before returning to step 100 and repeating the processing described above. Specifically, the CPU 14A may for example generate an alert sound indicating that the determination result of the vehicle cabin interior authentication is normal, and that the electronic key 32 is locked inside the vehicle. Note that the CPU 14A may report that the determination result of the vehicle cabin interior authentication is normal using a flashing lamp rather than an alert sound. Alternatively, the CPU 14A may report that the determination result of the vehicle cabin interior authentication is normal using both an alert sound and a flashing lamp. The reporting at step 116 may involve the same processing as the reporting at step 108.

On the other hand, at step 120, the CPU 14A determines whether or not the closing operation of the vehicle door 30 is complete. Namely, determination is made as to whether or not the closing operation of the vehicle door 30 has continued and this closing operation is now complete. Processing returns to step 112 and the processing described above is repeated in cases in which this determination is negative, whereas the series of processing is ended in cases in which this determination is affirmative.

By performing the processing in this manner, the closing operation of the vehicle door 30 is initiated in cases in which determination is made that the electronic key 32 is in the vehicle cabin exterior area, namely in cases in which the occupant has moved away from the vehicle, thereby enabling any uncertainly felt by the user due to the time lag before the closing operation of the vehicle door 30 is initiated to be reduced.

Moreover, in cases in which determination is made that the electronic key 32 is in the vehicle cabin interior area after the closing operation of the vehicle door 30 has been initiated, the closing operation of the vehicle door 30 is stopped, thereby preventing the electronic key 32 from being locked inside the vehicle.

Note that in FIG. 4, the processing of steps 104 and 112 corresponds to an example of an acquisition section, and the processing of steps 106, 110, 114, and 116 corresponds to an example of a control section.

Figure 5:
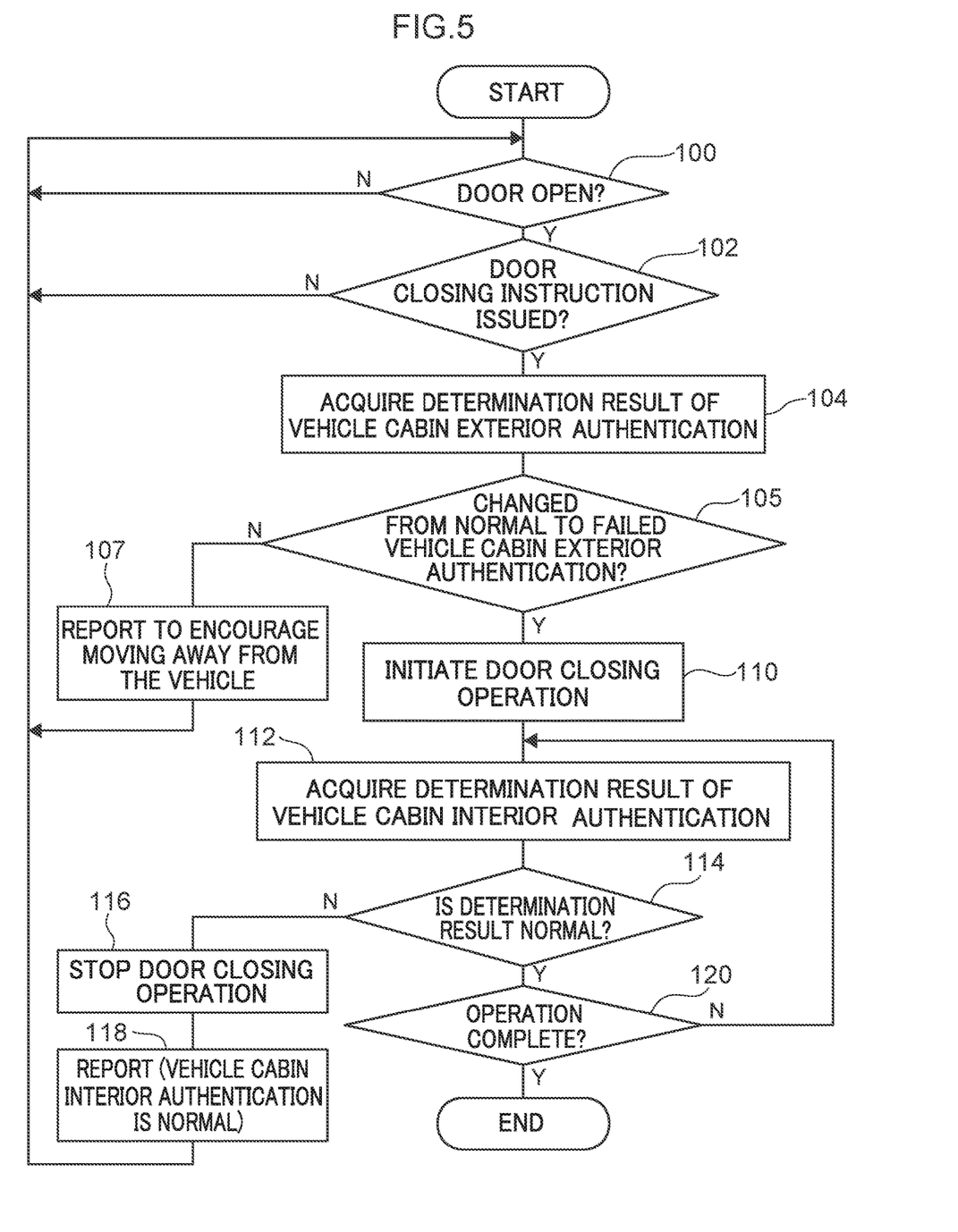
FIG. 5 is a flowchart illustrating an example of a modified example of a flow of processing executed by a door control ECU of a vehicle door opening/closing device according to an exemplary embodiment.

Next, explanation follows regarding a modified example of the processing performed by the door control ECU 14 of the vehicle door opening/closing device 10 according to the exemplary embodiment. FIG. 5 is a flowchart illustrating an example of the modified example of the flow of processing executed by the door control ECU 14 of the vehicle door opening/closing device 10 according to the exemplary embodiment. Note that processing similar to that in FIG. 4 is allocated same reference numerals in the following explanation.

At step 100, the CPU 14A determines whether or not the vehicle door 30 has been placed in the open state based on a state of the non-illustrated courtesy switch. Processing returns to step 100 in cases in which this determination is negative, whereas processing transitions to step 102 in cases in which this determination is affirmative.

At step 102, the CPU 14A determines whether or not a door closing instruction has been issued. This determination involves for example determining whether or not the door closing instruction has been issued by operation of the switch on the electronic key 32, or determining whether or not the detection target has been detected by the kick sensor 26. Alternatively, in cases in which a switch or the like for issuing a vehicle door closing instruction is provided separately to the kick sensor 26, determination may be made as to whether or not the door closing instruction has been issued using this switch. Processing returns to step 100 in cases in which this determination is negative, whereas processing transitions to step 104 in cases in which this determination is affirmative.

At step 104, the CPU 14A causes the authentication ECU 12 to execute a vehicle cabin exterior authentication, acquires a determination result of the vehicle cabin exterior authentication by the authentication ECU 12, and transitions to step 105.

At step 105, the CPU NA determines whether or not the determination result of the vehicle cabin exterior authentication acquired at step 104 has changed from a normal to a failed vehicle cabin exterior authentication. Namely, determination is made as to whether or not the user has moved away from the vehicle. Processing transitions to step 107 in cases in which this determination is negative, whereas processing transitions to step 110 in cases in which this determination is affirmative.

At step 107, the CPU 14A reports to prompt moving away from the vehicle before returning to step 100 and repeating the processing described above. Specifically, the CPU NA may for example generate an alert sound as a report to prompt moving away from the vehicle. Note that the CPU 14A may use a flashing lamp rather than an alert sound as a report to prompt moving away from the vehicle. Alternatively, the CPU 14A may use both an alert sound and a flashing lamp as a report to prompt moving away from the vehicle.

On the other hand, at step 110, the CPU 14A controls the actuator 24 so as to initiate the closing operation of the vehicle door 30, and transitions to step 112.

At step 112, the CPU 14A causes the authentication ECU 12 to execute a vehicle cabin interior authentication, acquires a determination result of the vehicle cabin interior authentication by the authentication ECU 12, and transitions to step 114.

At step 114, the CPU 14A determines whether or not the determination result of the vehicle cabin interior authentication acquired at step 112 is normal. Namely, determination is made as to whether or not the electronic key 32 has been locked inside the vehicle. Processing transitions to step 116 in cases in which this determination is affirmative, whereas processing transitions to step 120 in cases in which this determination is negative.

At step 116, the CPU 14A controls the actuator 24 so as to stop the closing operation of the vehicle door 30, and transitions to step 118. Note that the vehicle door 30 may be returned to its open position after the closing operation of the vehicle door 30 has been stopped.

At step 118, the CPU 14A reports that the determination result of the vehicle cabin interior authentication is normal before returning to step 100 and repeating the processing described above. Specifically, the CPU 14A may for example generate an alert sound indicating that the determination result of the vehicle cabin interior authentication is normal, and that the electronic key 32 is locked inside the vehicle. Note that the CPU 14A may report that the determination result of the vehicle cabin interior authentication is normal using a flashing lamp rather than an alert sound. Alternatively, the CPU 14A may report that the determination result of the vehicle cabin interior authentication is normal using both an alert sound and a flashing lamp. The reporting at step 118 may involve the same processing as the reporting at step 107.

On the other hand, at step 120, the CPU 14A determines whether or not the closing operation of the vehicle door 30 is complete. Namely, determination is made as to whether or not the closing operation of the vehicle door 30 has continued and this closing operation is now complete. Processing returns to step 112 and the processing described above is repeated in cases in which this determination is negative, whereas the series of processing is ended in cases in which this determination is affirmative.

Thus, in this modified example, the closing operation of the vehicle door 30 is initiated in cases in which determination is made that the electronic key 32 is no longer in the vehicle cabin exterior area after a determination was made that the electronic key 32 is in the vehicle cabin exterior area, namely in cases in which the occupant has moved away from the vehicle, thereby enabling the time lag before the closing operation of the vehicle door 30 is initiated to be reduced, and any uncertainly felt by the user as a result to be reduced.

In this modified example also, in cases in which determination is made that the electronic key 32 is in the vehicle cabin interior area after the closing operation of the vehicle door 30 has been initiated, the closing operation of the vehicle door 30 is stopped, thereby preventing the electronic key 32 from being locked inside the vehicle.

Note that in FIG. 5, the processing of steps 104 and 112 corresponds to an example of an acquisition section, and the processing of steps 105, 110, 114, and 116 corresponds to an example of a control section.

Moreover, although in the processing of FIG. 5 a closing instruction for the vehicle door 30 is received by the electronic key 32 or the kick sensor 26, there is no limitation thereto. For example, the processing of step 102 in FIG. 5 may be omitted, namely, control of the closing operation of the vehicle door 30 may be performed in cases in which the occupant has moved away from the vehicle.

Moreover, although an example has been described in which the exemplary embodiment is applied to the vehicle door 30 at the vehicle rear section, there is no limitation to a vehicle door at the vehicle rear section, and application may be made to a vehicle door at another position.

Note that although the processing executed by the door control ECU 14 in the above exemplary embodiment is described as software processing performed by executing a program, there is no limitation thereto. For example, the processing may be performed by hardware such as a graphics processing unit (GPU), an application specific integrated circuit (ASIC), or a field-programmable gate array (FPGA). Alternatively, the processing may be performed by a combination of both software and hardware. Moreover, in cases in which the processing is software processing, the program may be stored and distributed on various storage media.

Furthermore, the present disclosure is not limited to the above description, and obviously various other modifications may be implemented within a range not departing from the spirit of the present disclosure.

What is claimed is:

1. A vehicle control device comprising:
   a memory; and
   a processor that is coupled to the memory and is configured to:
   acquire a determination result as to whether a predetermined communication terminal is in a vehicle cabin interior area, and acquire another determination result as to whether or not the communication terminal is in a vehicle cabin exterior area; and
   based on the acquired determination results, initiate a closing operation of a vehicle door in a case in which a determination is made that the communication terminal is in the vehicle cabin exterior area, and stop the closing operation in a case in which a determination is made that the communication terminal is in the vehicle cabin interior area after the closing operation was initiated,
   wherein the processor is configured to initiate the closing operation prior to the determination that the communication terminal is in the vehicle cabin interior area.

2. The vehicle control device of claim 1, wherein the processor is configured to continue the closing operation in a case in which a determination is made that the communication terminal is not in the vehicle cabin interior area after the closing operation was initiated.

3. The vehicle control device of claim 1, wherein the processor is configured to initiate the closing operation in a case in which a closing instruction for the vehicle door has been received.

4. The vehicle control device of claim 1, wherein the processor is configured to initiate the closing operation in a case in which a determination is made that the communication terminal is in the vehicle cabin exterior area and, subsequently, another determination is made that the communication terminal is no longer in the vehicle cabin exterior area.

5. A vehicle control system comprising:
   the vehicle control device of claim 1;
   the communication terminal; and
   a drive section configured to perform drive opening and closing of the vehicle door under control of the vehicle control device.

6. A vehicle control method comprising:
   acquiring a determination result as to whether or not a predetermined communication terminal is in a vehicle cabin interior area, and acquiring another determination result as to whether or not the communication terminal is in a vehicle cabin exterior area; and
   based on the acquired determination results, initiating a closing operation of a vehicle door in a case in which a determination is made that the communication terminal is in the vehicle cabin exterior area, and stopping the closing operation in a case in which a determination is made that the communication terminal is in the vehicle cabin interior area after the closing operation was initiated,
   wherein the closing operation is initiated prior to the determination that the communication terminal is in the vehicle cabin interior area.

7. A non-transitory storage medium storing a program executable by a computer to perform vehicle control processing, the vehicle control processing comprising:
   acquiring a determination result as to whether or not a predetermined communication terminal is in a vehicle cabin interior area, and acquiring another determination result as to whether or not the communication terminal is in a vehicle cabin exterior area; and
   based on the acquired determination results, initiating a closing operation of a vehicle door in a case in which a determination is made that the communication terminal is in the vehicle cabin exterior area, and stopping the closing operation in a case in which a determination is made that the communication terminal is in the vehicle cabin interior area after the closing operation was initiated,
   wherein the closing operation is initiated prior to the determination that the communication terminal is in the vehicle cabin interior area.

* * * * *